United States Statutory Invention Registration [19]

[11] Reg. Number: H898

Langner, Jr. et al. [43] Published: Mar. 5, 1991

[54] RADON FREE STORAGE CONTAINER AND METHOD

[75] Inventors: G. Harold Langner, Jr., Mack; Mark J. Rangel, Austin, both of Colo.

[73] Assignee: The United States of America as represented by the United States Department of Energy, Washington, D.C.

[21] Appl. No.: 372,490

[22] Filed: Jun. 28, 1989

[51] Int. Cl.[5] ..... B01J 11/18

[52] U.S. Cl. ..... 422/40; 422/903; 250/253; 250/255

[58] Field of Search ..... 422/40, 903; 436/25, 436/26, 32; 250/253, 255, 252.1, 364, 472.1, 474.1, 482.1, 496.1, 497.1, 506.1, 507.1, 515.1; 73/23, 863.21; 210/682; 141/66

[56] References Cited

U.S. PATENT DOCUMENTS

| | | | |
|---|---|---|---|
| 3,979,593 | 9/1976 | Spragg et al. | 250/364 |
| 4,344,467 | 8/1982 | Lahde | 141/66 |
| 4,700,070 | 10/1987 | Kovac | 250/253 |
| 4,801,800 | 1/1989 | Scheible | 250/255 |

OTHER PUBLICATIONS

George, Andreas C., "Passive, Integrated Mesurement of Indoor Radon Using Activated Carbon," Dept. of Energy, May 13, 1983.

*Primary Examiner*—John S. Maples
*Assistant Examiner*—Joseph D. Anthony
*Attorney, Agent, or Firm*—Mark P. Dvorscak; Robert J. Fisher; William R. Moser

[57] ABSTRACT

A radon free containment environment for either short or long term storage of radon gas detectors can be provided as active, passive, or combined active and passive embodiments. A passive embodiment includes a resealable vessel containing a basket capable of holding and storing detectors and an activated charcoal adsorbing liner between the basket and the containment vessel wall. An active embodiment includes the resealable vessel of the passive embodiment, and also includes an external activated charcoal filter that circulates the gas inside the vessel through the activated charcoal filter. An embodiment combining the active and passive embodiments is also provided.

25 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADON FREE STORAGE CONTAINER AND METHOD

CONTRACTUAL ORIGIN OF THE INVENTION

The U.S. Government has right in this invention pursuant to Contract No. DE-AC07-86ID12584 between the U.S. Department of Energy and UNC Geotech.

BACKGROUND OF THE INVENTION

This invention relates generally to storage and containment of devices used in conjunction with radioactivity monitoring and measurement. In particular, this invention relates to a storage device for radon gas detectors.

Radon gas is a naturally occurring radioactive noble gas that results from the decay of radium 226. It is long been recognized that exposure to radon gas (and radon gas "daughters" that occur as a result of radon gas decay) can pose a significant health hazard. Although testing for radon gas has been done for many years, until relatively recently, concern over exposure to radon gas was primarily associated with workers in the uranium mining industry or others whose work brought them in contact with uranium ore. In recent years, it has been recognized that radon gas can seep out of the ground through building foundations and can accumulate inside the buildings. When radon gas accumulates in a human environment, it is inhaled thereby exposing the lungs to radioactivity. The health hazards of radon gas exposure are associated with the increased likelihood for the development of lung cancer that may not occur until 10 to 20 years or more after exposure. As a consequence, it is now considered that naturally occurring radon gas can pose a significant health hazard to the general population. The United States Environmental Protection Agency (USEPA) estimates that as many as 20,000 deaths occur each year as a result of exposure to radon gas. The Department of Energy supports the study of radon gas measurement and detection through its Office of Remedial Action and Waste Technology.

Because of the present awareness of the health hazards associated with exposure to radon gas, widespread testing programs have been undertaken and further testing programs are planned. This testing includes buildings such as homes, schools and offices. To achieve widespread testing, it is recognized that many samples must be obtained. In fact, it is often considered appropriate to obtain several samples of a single building from different locations within the building. The testing for radon gas is normally performed by placement of detector devices in the location to be tested. These detectors typically contain an alpha track registration material which is sensitive to the radioactivity associated with radon gas. After placement of the detectors in the building being tested for an established period of time, typically on the order of several weeks to several months, the detectors are removed from the building and conveyed to a laboratory. At the laboratory, the detectors are analyzed with suitable equipment for the detection and measurement of radon gas. From this analysis a determination of the presence and concentration of radon gas in the building tested can be inferred. Accurate measurement of radon gas with the scheme described above is complicated by several factors. First of all, radon gas is widely present in the earth's environment and exists extensively in the background. Also, radon gas tends to diffuse so that a sampling scheme must take this into account. Also, when radon gas is sampled indoors, the degree to which the building is airtight (i.e., resistant to outside air exchange) can highly influence the radon gas measured.

Even if the above concerns regarding sampling are adequately addressed, other factors can be encountered that result in invalid data. One factor that can introduce significant errors into the sampling is contamination of the detectors. Normally, to obtain a sample, a detector which includes a sealed container containing a medium that is sensitive to radon gas (e.g. the alpha track registration material) is exposed to the air at the location to be tested for a period of time. After this period of time, the container is resealed and conveyed to a laboratory for analysis. It can be appreciated that it is essential that the detectors are not exposed to the air or any other potential source of contaminating radioactivity either before the sampling takes place or after the sampling during the time the detector is being conveyed to the laboratory for analysis. For this reason, detectors include airtight containers made of aluminized mylar in which the detectors can be sealed. Aluminized mylar is necessary because radon gas can diffuse through many types of ordinary plastics. If the aluminized mylar seal is breached either before or after the detector is installed in the test location, the detector can become contaminated and the months of testing invalidated. In addition, even though the containers containing the detectors are each individually sealed, since it is often the case that the sampling is done by persons without scientific or technical training, it is possible that leaks or faulty sealing can occur as a result of inexperienced handling. Moreover, if the detectors are stored for a time, such as during transit or while awaiting analysis in the laboratory, the possibility exists that the airtight seals on the containers may develop leaks thereby rendering the samples invalid.

At the present time there are no commercially available containment devices for the short or long term storage of radon gas detectors. If any attempt at preventing radioactive contamination of such detectors is made at all, it is done on an individual basis and without uniform standardized procedures.

Accordingly, it is an object of the present invention to provide an apparatus for the short and long term storage of radon gas detectors in a nearly radon free environment.

It is another object of the present invention to provide a device that provides for the storage of radon gas detectors in a radon free environment in an economical and efficient manner.

It is yet another object of the present invention to provide an apparatus for the storage of radon gas detectors that complements existing sealing schemes for radon gas detectors, such as aluminized mylar wrappers.

It is another object of this invention to provide an apparatus for the short and long term storage of radon gas detectors that provides a uniform, standardized method and that affords a high degree of protection from contamination.

It is yet still another object of this invention to provide both an active and passive scheme for the storage of radon gas detectors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise a resealable container which is capable of holding and storing radon detectors. Activated charcoal in the container permits the exchange of radon gas within the container and creates a radon free environment for the storage of radon detectors within the container. The activated charcoal can form a filter, and a pump may be connected to the filter to circulate the gas inside the container. A method for providing a radon free containment environment is also provided, and may comprise placing a radon detector in a releasable vessel, locating activated charcoal within the vessel to allow the exchange of radon gas between the vessel and the charcoal, and sealing the container.

DETAILED DESCRIPTION OF THE INVENTION

Figure 1:
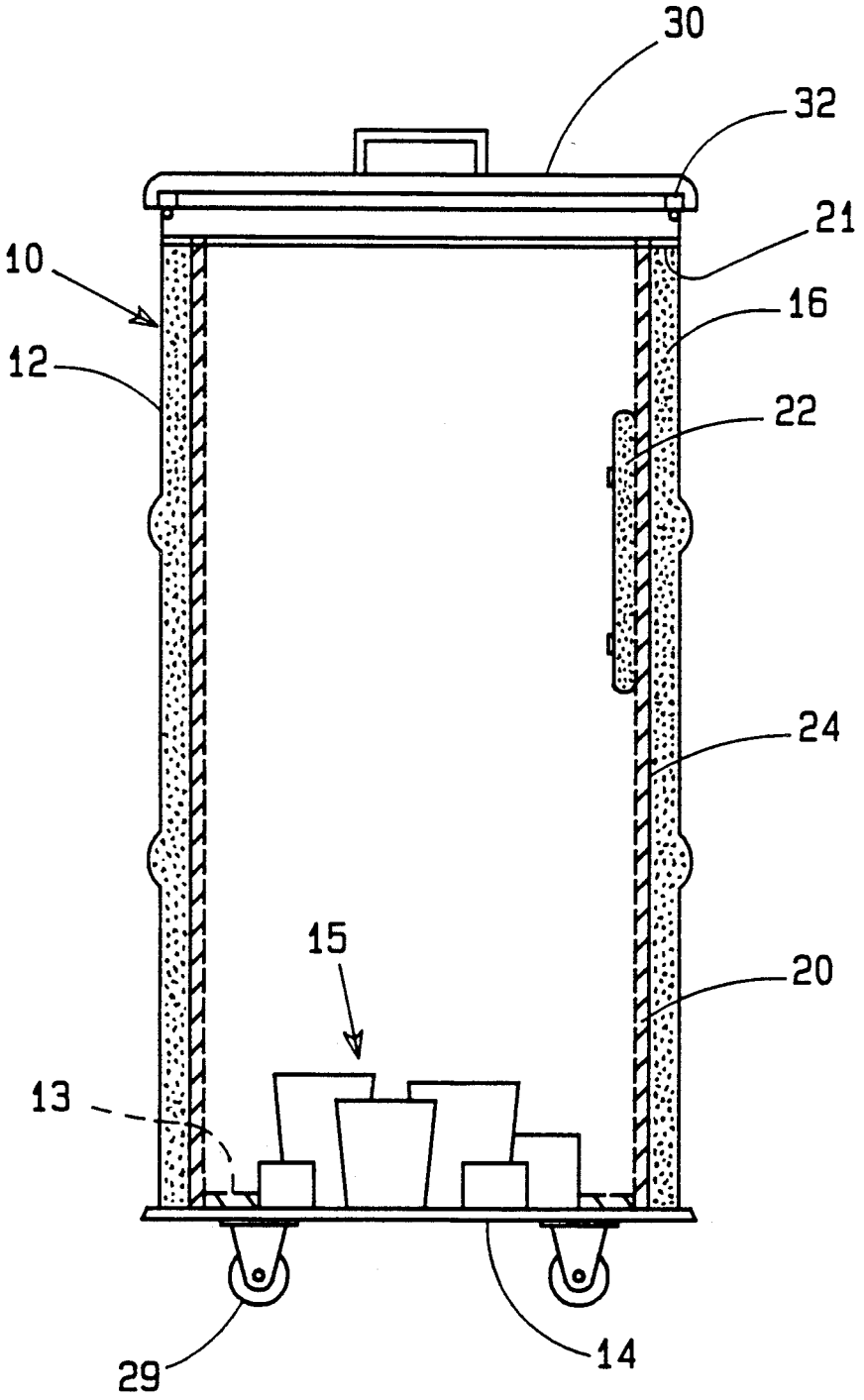
FIG. 1 depicts a passive embodiment of the present invention.

Referring to FIG. 1, there is depicted a first embodiment of the present invention. This embodiment is considered to be a passive design, i.e., it contains radon detectors without the action of pumping equipment or other moving parts. A drum 10 is provided having solid side wall 12 and a bottom 14. A typical 55 gallon metal drum may be used provided that it has no leaks. The drum 10 should be structurally rigid and secure for the safe containment of the detectors 15 for a long period of time. Disposed around the interior of drum 10 is liner 16. Liner 16 is made of activated charcoal. Liner 16 may also extend to cover the interior of the bottom 14 of drum 10. In the preferred embodiment of the passive design, the liner 16 is 1 to 2 inches in thickness.

A perforated basket 20 is located inside the drum 10 interior to liner 16. Perforated basket 20 should be structurally rigid and secure so as to support and contain detectors 15 which can be placed directly in the perforated basket 20. Perforated basket 20 is fastened to the bottom 14 of drum 10. The perforations in perforated basket 20 should be sufficient in size to allow ready exchange of gas from the interior of the basket 20 to the liner 16. In this embodiment, perforated basket 20 is made of an expanded metal having one-half inch wide apertures (perforations) and rolled into a cylindrical shape with a diameter of 19 inches. Perforated basket 20 may have a bottom 13 attached thereto which may be made of the same material.

A screen 24 is provided between the perforated basket 20 and the activated charcoal liner 16. The activated charcoal liner 16 would normally be granular and would tend to spill through the perforations of the perforated basket 20. The screen 24 which may be made of copper serves to keep the granular activated charcoal of liner 16 from spilling into the interior of perforated basket 20. Screen 24 need not be structurally rigid inasmuch as the material of the perforated basket 20 imparts sufficient rigidity to hold up the screen 24. Screen 24 should have a mesh with openings small enough so that the granular charcoal does not spill through into the interior of basket 20 yet large enough to allow the ready exchange of gas from the interior of perforated basket 20 to the activated charcoal liner 16.

A retainer ring 21 sized to fit between drum wall 12 and basket 20 is located so as to cover the top of activated charcoal liner 16. Retainer ring 21 may be made of cardboard.

A desiccant 22 may also be located within the interior of perforated basket 20 for the purpose of absorbing moisture from the air inside drum 10. Moisture can degrade the activated charcoal liner 16.

Lid 30 is affixed to drum 10 to provide an airtight seal after the detectors 15 have been placed inside drum 10 in perforated basket 20. A rubber gasket 32 can be provided around the rim of drum 10 to provide this airtight seal. The drum 10 may also be equipped with wheels 29 to ease transportation of drum 10.

In operation, detectors 15 are placed in the drum 10 in the perforated basket 20 and the lid 30 is affixed to drum 10. When detectors 15 are contained in the sealed drum 10 in this manner, any radon gas that might leak out of used detector devices or any radon gas in the atmosphere that might leak into the drum 10 from outside would be adsorbed in the charcoal liner 16. In accordance with the purposes of this invention, the detectors 15 should be contained in the drum 10 both before their installation in the buildings to be tested and after removal from the buildings during storage and shipment to the laboratory where analysis of the detectors can take place. It is recommended that opening of drum 10 be minimized during this storage period as exposure to the air may contaminate the detectors.

Because the half life of the radon is 3.8 days, decay of the radon occurs while the radon is trapped in the charcoal liner. Therefore, the liner can be reused indefinitely.

Figure 2:
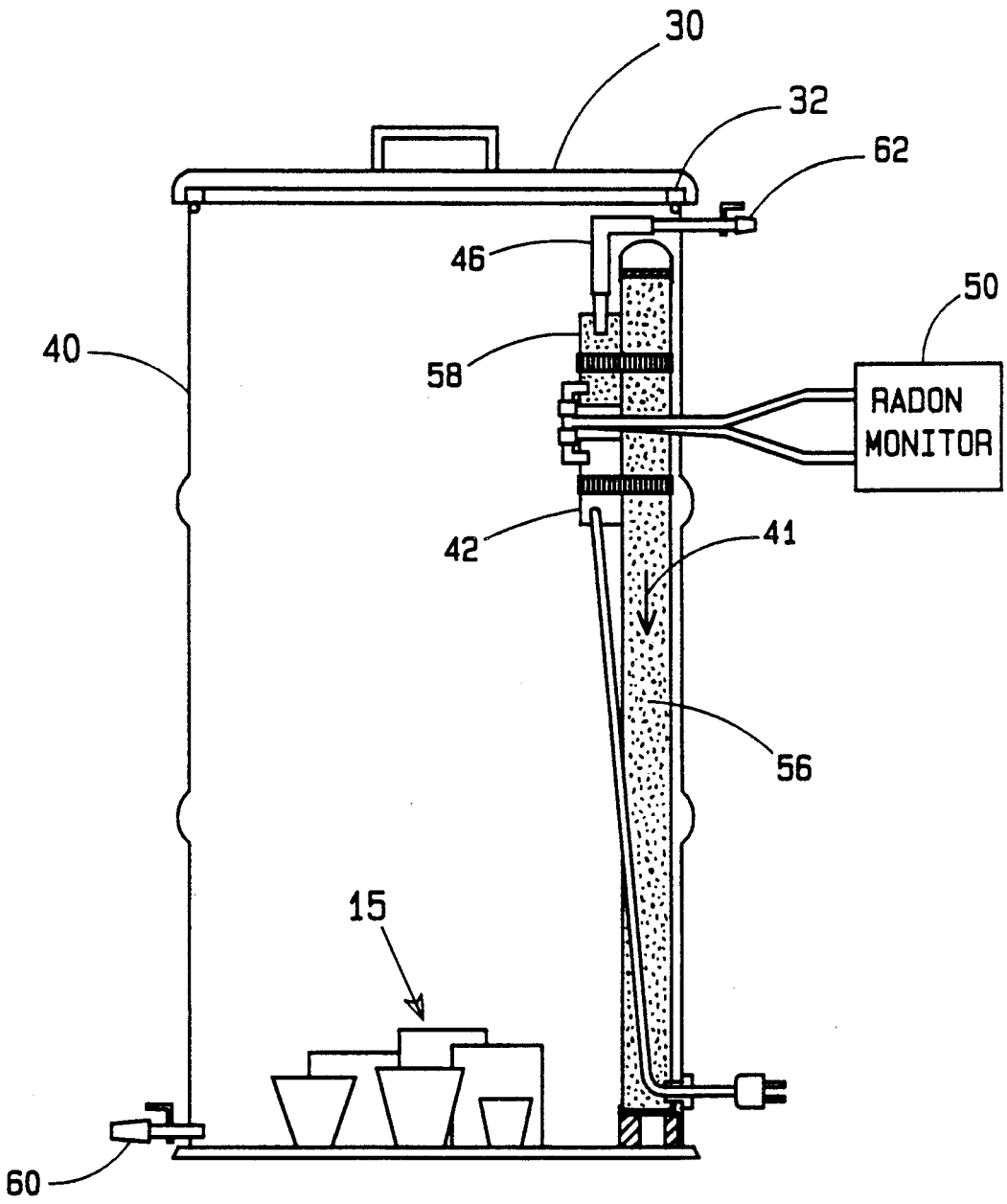
FIG. 2 depicts an active embodiment of the present invention.

A second embodiment of the invention is depicted in FIG. 2. This embodiment is considered an active embodiment because the gas in the containment chamber is actually circulated through the activated charcoal by means of a pump. Referring to FIG. 2, there is provided a resealable chamber 40 capable of containing and storing radon detectors 15 for extended periods of time. Chamber 40 should be airtight and structurally rigid and secure for the purpose of containing detectors 15. A pump 42 is located so as to draw the gas present inside chamber 40 via a circulation flow line 46 through activated charcoal filter 56 in the direction indicated by arrow 41. In this embodiment, it is preferred that the pump 42 and the activated charcoal filter 56 are located inside chamber 40 so that any leaks from the pump 42 or activated charcoal filter 56 are contained by chamber 40. In the preferred embodiment, pump 42 would operate on ordinary electric current and a cord and plug extending through an airtight opening in the wall of drum 10 as shown in FIG. 2 would be provided.

In addition, this embodiment may include a means for detecting whether any radon gas is in the chamber 40 and measuring the amount of radon gas in the chamber 40. An adapter 51 may be located in the circulation flow line 46 connecting pump 42 and activated charcoal filter 56. Adapter 51 allows shunting the gas circulation flow through a radon gas monitor 50 which would normally be located outside the chamber 40. Through the use of adapter 51 a single radon monitor (which is a relatively expensive piece of equipment) can be alternately connected to many containment chambers.

Also, moisture removal means (desiccant) 58 may be located in the circulation flow line connecting the pump 42 to the activated charcoal filter 56.

In operation, the detectors 15 are placed in the container 40 which is then sealed with lid 30 so that the chamber 40 is airtight. As in the previous embodiment, the chamber 40 is not normally opened until the detectors 15 are either ready for use in the building to be tested or are back at the laboratory after use and ready for analysis. In this embodiment, the activated charcoal is contained in and forms part of filter 56. The pump 42 draws the gas in chamber 40 through the activated charcoal filter 56 and, optionally, the moisture removal means 58 and the radon gas monitor 50. Filter 56 in this active embodiment serves the same purpose as adsorbing liner 16 in the previous (passive) embodiment, i.e. to trap radon gas. In the preferred embodiment, filter 56 is approximately 3 inches in diameter. By circulating the gas, pump 42 ensures that any radon gas present in the chamber 40 is trapped in the activated charcoal filter 56. The radon gas monitor 50 may be used to continuously test the gas for radon thereby providing a means for determining whether any contamination has taken place. The moisture removal means (desiccant) 58 removes humidity from the circulating gas flow. Moisture in the gas can degrade the performance of the charcoal filter 56.

In addition, the embodiment depicted in FIG. 2 may include a gas inlet 60 into chamber 40. In an alternate method of operation, the chamber 40 and the other components can be purged by introducing a supply of radon-free gas such as nitrogen or aged air. This would serve to remove any radon gas known or suspected to be present in the system.

In the event that testing of the gas in the system is desired, a grab sample line 62 located in circulation flow line 46 permits sampling the gas circulating in the system.

(In an alternative configuration, pump 42 and filter 56 could be located external to the chamber 40 if warranted for example by a need to change filters or pumps during storage without opening the chamber.)

Although this second embodiment includes active components that make it inherently more expensive to construct and operate than the first embodiment, this active embodiment contains features that can offset the additional cost. Because this embodiment uses a pump 42 to circulate the gas from the containment chamber 40 through the filter 56, the removal of any radon gas can proceed more rapidly and with a higher degree of assurance. This higher level of assurance is furthered by the inclusion of the radon gas monitor 50 located in the circulation flow line 46 between the containment chamber 40 and the charcoal filter 56. This allows an active means of monitoring for the presence of radon gas and further can provide a record of any exposure or contamination that may have taken place during the period of storage. This embodiment also provides for the purging of the containment vessel with radon free gas for the initial placement of detectors and for the sampling of the gas in the interior of the containment vessel during the period of storage as a supplement to or in response to the operation of the radon gas monitor.

Figure 3:
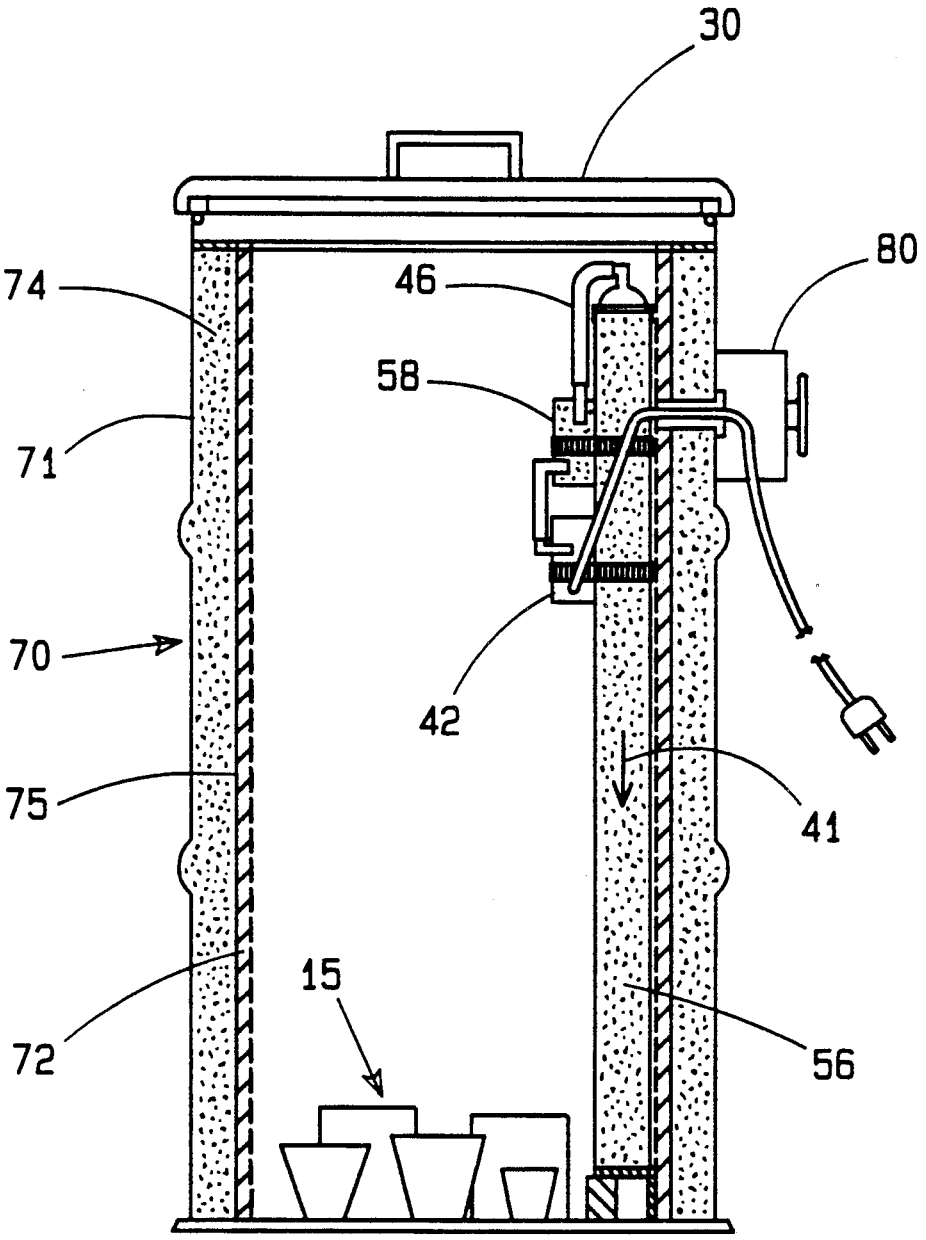
FIG. 3 depicts a combination active/passive embodiment of the present invention.

A third embodiment of the present invention combines the active and passive features of the embodiments described above. This combined active/passive embodiment includes both an activated charcoal adsorber as in the passive embodiment depicted in FIG. 1 and an activated charcoal filter as in the active embodiment depicted in FIG. 2. Referring to FIG. 3, the active/passive embodiment includes the elements of the active embodiment depicted in FIG. 2 with the exception that the chamber 40 of FIG. 2 is replaced by chamber 70 depicted in FIG. 3. Referring to FIG. 3, the chamber 70 includes an outer wall 71 which is structurally rigid and airtight. Detectors 15 are contained in chamber 70 in perforated basket 72. Activated charcoal liner 74 is located between outer wall 71 and perforated basket 72. A screen 75 is located between the perforated basket 72 and the activated charcoal liner 74 to keep the activated charcoal out of the perforated basket 72 as described above with respect to the embodiment depicted in FIG. 1.

The active/passive embodiment depicted in FIG. 3 can operate in a manner similar to the active embodiment depicted in FIG. 2. Pump 42 may be located in chamber 70 and operates to draw the gas from the chamber 70 through an activated charcoal filter 56 as discussed with respect to the previous embodiment. In addition, the activated charcoal liner 74 serves to adsorb radon gas that might leak out of the detectors 15 or might leak in from outside chamber 70. An advantage of the active/passive embodiment is that by increasing the amount of activated charcoal around the detectors 15, the likelihood that any radon gas will be trapped is thereby also increased. Moreover, a further advantage of the active/passive embodiment is that the pump 42 can be operated intermittently or only as necessary to circulate the gas through the radon gas monitor 50 to check if a leak of radon gas has occurred. A controller/timer 80 may be provided for this purpose. By operating the pump only intermittently, the operating life of the pump can be extended and the requirement for providing energy to operate the pump can be decreased. These considerations can be factors if storage of detectors for extended periods of time is contemplated.

The embodiments of the invention in which an exclusive property or privilege is claimed are defined as follows:

1. An apparatus for providing a nearly radon free containment environment for the storage of detectors comprising:

a resealable containment vessel capable of holding and storing detectors within, and activated charcoal located with respect to said resealable containment vessel so as to allow a ready exchange of radon gas between the interior of said resealable containment vessel and said activated charcoal whereby a radon free environment can be provided inside said resealable containment vessel for the storage of detectors.

2. The apparatus of claim 1 including:

a detector holding basket located inside said resealable containment vessel.

3. The apparatus of claim 2 in which said activated charcoal forms an interior adsorbing liner inside said resealable containment vessel and further in which said detector holding basket is surrounded by said activated charcoal adsorbing liner.

4. The apparatus of claim 3 in which said detector holding basket is perforated to allow the ready exchange of radon gas between the interior of said detector holding basket and said activated charcoal adsorbing liner.

5. The apparatus of claim 4 including:

a screen separating said detector holding basket and said activated charcoal adsorbing liner, said screen having a mesh opening size capable of preventing portions of said activated charcoal from spilling into the interior of said detector holding basket.

6. The apparatus of claim 5 in which said resealable containment vessel includes:

a resealable lid capable of allowing the placement of detectors in the interior of said detector holding basket inside said resealable containment vessel, and further in which said resealable lid is capable of providing an airtight seal for said resealable containment vessel.

7. The apparatus of claim 6 in which said activated charcoal adsorbing liner is approximately two inches in thickness.

8. The apparatus of claim 7 in which said resealable containment vessel is a 55 gallon metal drum.

9. The apparatus is claim 8 in which said detector holding basket is a cylinder having a diameter of approximately 19 inches.

10. The apparatus of claim 1 in which said activated charcoal forms a filter, and further in which said apparatus of claim 1 includes:

a pump connected to said filter so that operation of said pump circulates the gas inside said resealable containment vessel through said filter whereby a radon free environment can be provided inside said resealable containment vessel for the storage of detectors.

11. The apparatus of claim 10 including:

an adapter capable of connecting a radon gas monitor to a gas flow line that connects the inside of said resealable containment vessel, said pump and said filter whereby the presence of radon gas in said resealable containment vessel can be detected.

12. The apparatus of claim 11 including:

moisture removal means located in the gas flow line so that when gas circulates from said resealable containment vessel to said filter, said moisture removal means can remove moisture from the gas.

13. The apparatus of claim 12 including:

a nitrogen inlet located with respect to said resealable containment vessel so that nitrogen gas can be introduced to said resealable containment vessel so as to purge said resealable containment vessel.

14. The apparatus of claim 13 including:

a grab sampling line located with respect to said resealable containment vessel so that samples of gas contained in said resealable containment vessel can be obtained.

15. The apparatus of claim 10 including:

an activated charcoal adsorbing liner located around the interior of said resealable containment vessel, and a detector holding basket surrounded by said activated charcoal adsorbing liner.

16. The apparatus of claim 15 including:

an adaptor capable of connecting a radon gas monitor to a gas flow line that connects the inside of said resealable containment vessel, said pump and said filter whereby the presence of radon gas in said resealable containment vessel can be detected.

17. The apparatus of claim 16 including:

moisture removal means located in the gas flow line so that when gas circulates from said resealable containment vessel to said filter, said moisture removal means can remove moisture from the gas.

18. The apparatus of claim 17 including:

a nitrogen inlet located with respect to said resealable containment vessel so that nitrogen gas can be introduced to said resealable containment vessel so as to purge said resealable containment vessel.

19. The apparatus of claim 18 including:

a grab sampling line located with respect to said resealable containment vessel so that samples of gas contained in said resealable containment vessel can be obtained.

20. A method for providing a radon free containment environment for the storage of detectors comprising:

placing a detector in a containment vessel capable of holding and storing detectors within, and further in which activated charcoal is located within the containment vessel so as to allow a ready exchange of radon gas between the interior of the releasable containment vessel and the activated charcoal, and sealing the containment vessel;

whereby a radon free environment can be provided inside the containment vessel for the storage of a detector.

21. The method of claim 20 including the step of:

pumping the gas inside the containment vessel through the activated charcoal whereby a radon free environment can be provided inside the resealable containment vessel for the storage of a detector.

22. The method of claim 21 including the step of:

monitoring for radon gas in the resealable containment vessel as the gas from the resealable containment vessel is being pumped to the activated charcoal whereby the presence of radon gas in the resealable containment vessel can be detected.

23. The method of claim 22 including the step of:

removing the moisture in the gas as the gas from the resealable containment vessel is being pumped to the charcoal filter.

24. The method of claim 23 including the step of:

purging the resealable containment vessel with a radon free gas to establish a radon free environment in the containment vessel.

25. The method of claim 24 including the step of:

sampling the gas contained in the resealable containment vessel.

* * * * *